(12) United States Patent
Robertson et al.

(10) Patent No.: US 7,831,236 B2
(45) Date of Patent: Nov. 9, 2010

(54) SECURE PROVISIONING METHODS AND APPARATUS FOR MOBILE COMMUNICATION DEVICES OPERATING IN WIRELESS LOCAL AREA NETWORKS (WLANS)

(75) Inventors: Ian Michael Robertson, Waterloo (CA); Thomas Charles Nagy, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 723 days.

(21) Appl. No.: 11/482,864

(22) Filed: Jul. 7, 2006

(65) Prior Publication Data

US 2008/0008143 A1   Jan. 10, 2008

(51) Int. Cl.
*H04M 1/66* (2006.01)
*H04M 1/68* (2006.01)
*H04M 3/16* (2006.01)
*H04W 4/00* (2009.01)

(52) U.S. Cl. ............ 455/410; 455/411; 455/422.1
(58) Field of Classification Search ......... 455/410, 455/411, 422.1
See application file for complete search history.

(56) References Cited

U.S. PATENT DOCUMENTS

| | | | |
|---|---|---|---|
| 6,477,156 B1 * | 11/2002 | Ala-Laurila et al. | 370/331 |
| 6,909,705 B1 * | 6/2005 | Lee et al. | 370/338 |
| 7,277,547 B1 * | 10/2007 | Delker et al. | 380/270 |
| 7,580,701 B2 * | 8/2009 | Ross et al. | 455/411 |
| 2001/0041591 A1 * | 11/2001 | Carroll | 455/557 |
| 2002/0153994 A1 * | 10/2002 | Bonner et al. | 340/5.21 |
| 2003/0046541 A1 * | 3/2003 | Gerdes et al. | 713/168 |
| 2004/0009792 A1 | 1/2004 | Weigand | |
| 2004/0176024 A1 | 9/2004 | Hsu et al. | |
| 2004/0248557 A1 | 12/2004 | Muratsu | |
| 2005/0048972 A1 | 3/2005 | Dorenbosch et al. | |
| 2005/0063380 A1 | 3/2005 | Kayalackakom et al. | |
| 2005/0201557 A1 * | 9/2005 | Ishidoshiro | 380/44 |

(Continued)

FOREIGN PATENT DOCUMENTS

EP    1152628 A1    11/2001

(Continued)

OTHER PUBLICATIONS

Extended European Search Report, Oct. 24, 2007, European Patent Application No. 07107452.

(Continued)

*Primary Examiner*—Vincent P Harper
*Assistant Examiner*—Marisol Figueroa
(74) *Attorney, Agent, or Firm*—John J. Oskorep, Esq.

(57) ABSTRACT

Methods and apparatus for use in securely provisioning a mobile communication device in a wireless local area network (WLAN) having a plurality of wireless access points (APs) are described. In one illustrative method, a provisioning procedure is performed between the mobile communication device and the WLAN via the provisioning wireless AP while the mobile communication device is positioned within a provisioning radio frequency (RF) coverage region of the provisioning wireless AP. However, the provisioning RF coverage region is otherwise confined so that a plurality of other mobile communication devices of the WLAN are restricted from access therefrom during the provisioning procedure. The provisioning RF coverage region may be confined by providing the provisioning wireless AP within a secured room, by providing an electromagnetic shield around the provisioning wireless AP, or both, as examples.

14 Claims, 10 Drawing Sheets

U.S. PATENT DOCUMENTS

2005/0245235 A1* 11/2005 Vesuna .................. 455/411
2007/0093201 A1*  4/2007 Hsu et al. ................ 455/3.04

FOREIGN PATENT DOCUMENTS

EP         1460716 A1    9/2004
EP         1530321 A1    5/2005
JP         2003101553    9/2004

OTHER PUBLICATIONS

European Search Report & Written Opinion for EP Application #06116836.5 Dated Sep. 26, 2006.

* cited by examiner

SECURE PROVISIONING METHODS AND APPARATUS FOR MOBILE COMMUNICATION DEVICES OPERATING IN WIRELESS LOCAL AREA NETWORKS (WLANS)

BACKGROUND

1. Field of the Technology

The present disclosure relates generally to mobile communication devices which communicate with wireless communication networks such as wireless local area networks (WLANs), and more particularly to secure provisioning procedures for mobile communication devices which operate in WLANs.

2. Description of the Related Art

In wireless communication networks, such as wireless local area networks (WLANs) which operate in accordance with 802.11-based standards, secure provisioning of information "over-the-air" for mobile communication devices has not been adequately addressed. Provisioning information may be or include various sensitive information, such as authentication keys, passwords, or network identifiers. If such sensitive information is sent over-the-air by the WLAN in a provisioning procedure, it may be exposed and vulnerable to outside users.

For example, network identifiers may be utilized by mobile communication devices to identify the appropriate WLAN to connect with and obtain services. For 802.11-based WLANs, the network identifiers are called extended service set identifiers (ESSIDs). After a mobile device is manufactured and sold, the ESSID of the WLAN of the mobile device needs to be "provisioned" or saved in memory of the mobile device. Typically, the ESSID is entered in by the end user through a keyboard of the mobile device. It is desirable, however, to minimize data entry steps for provisioning a mobile device. Thus, it would be more desirable to have the WLAN itself provision the mobile device with the ESSID, but the mobile device needs the ESSID of the WLAN in order to initially connect with its WLAN. If the ESSID is sent over-the-air by the WLAN in a provisioning procedure, it is exposed and vulnerable to outside users who may gain access to the private WLAN.

Accordingly, what are needed are methods and apparatus for securely provisioning mobile communication devices in WLANs.

BRIEF DESCRIPTION OF THE DRAWINGS

Embodiments of present invention will now be described by way of example with reference to attached figures, wherein.

DETAILED DESCRIPTION OF THE PREFERRED EMBODIMENTS

Methods and apparatus for use in securely provisioning a mobile communication device in a wireless local area network (WLAN) having a plurality of wireless access points (APs) are described. In one illustrative method, a provisioning procedure is performed between the mobile communication device and the WLAN via the provisioning wireless AP while the mobile communication device is positioned within a provisioning radio frequency (RF) coverage region of the provisioning wireless AP. However, the provisioning RF coverage region is otherwise confined so that a plurality of other mobile communication devices of the WLAN are restricted from access therefrom during the provisioning procedure. The provisioning RF coverage region may be confined by providing the provisioning wireless AP within a secured room, by providing an electromagnetic shield around the provisioning wireless AP, or both, as examples.

Figure 1:
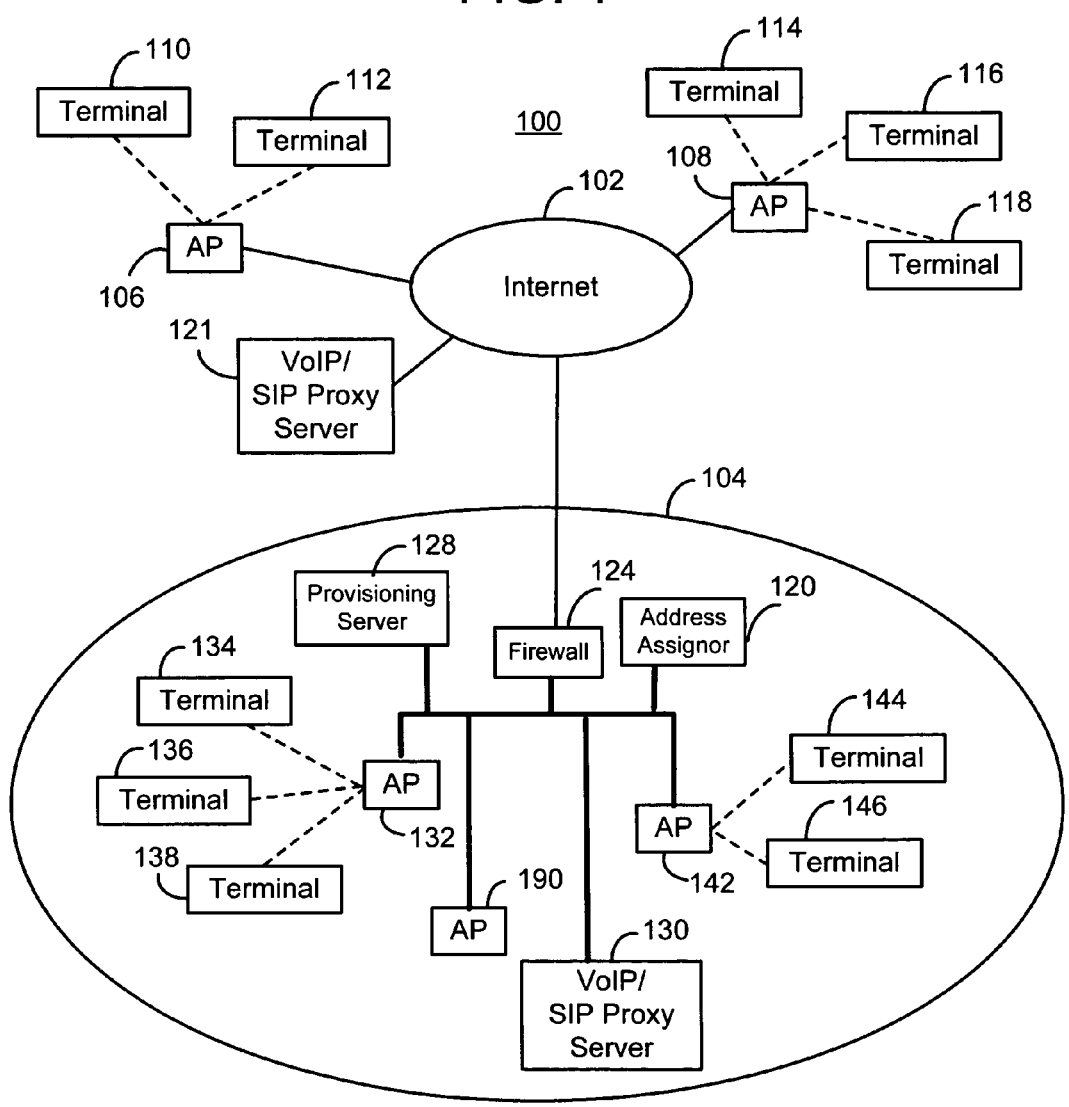
FIG. 1 is a block diagram which illustrates a communication system which includes a communication network having a wireless local area network (WLAN) with a plurality of wireless access points (APs)

FIG. 1 is a block diagram which illustrates a communication system 100 which includes a public network 102 (e.g. the Internet) and a private network 104. A firewall 124 may be provided in private network 104 for preventing unauthorized access from users in public network 102. In the present embodiment, private network 104 is or includes a wireless local area network (WLAN). In the WLAN, terminals may connect to their associated networks through access points (APs) as shown. Preferably, at least some of the APs are wireless APs of the WLAN and at least some of the terminals are mobile/wireless communication devices which interface and connect through these wireless APs. Such terminals and APs may operate in accordance with well-known IEEE 802.11 standards. The terminals shown in public network 102 include terminals 110 and 112 which have interfaced with AP 106, and terminals 114, 116, and 118 which have interfaced with AP 108. The terminals shown in private network 104 include terminals 134, 136, 138 which have interfaced with AP 190, and terminals 144 and 146 which have interfaced with AP 142.

Private network 104 which includes the WLAN provides various data and communication services to its terminals. For example, private network 104 may provide for voice telephony communication services for its terminals with use of Voice over IP (VoIP) communications. For these types of services, private network 104 may utilize a VoIP server architecture for VoIP communication sessions, and/or an e-mail server architecture for e-mail message communications, as examples. For these purposes, communication system 100 may also include at least one VoIP or Session Initiation Protocol (SIP) proxy server. In the present embodiment, communication system 100 has a VoIP or SIP proxy server 121 in public network 102 and a VoIP or SIP proxy server 130 in private network 104. Note that some communication applications utilized by terminals, such VoIP applications, require the use of SIP. SIP is well-documented in standard documents such as Request For Comments (RFC) 3261.

Private network 104 also has a provisioning server 128 which assists in performing wireless network provisioning procedures with terminals for their receipt and programming of provisioning information (e.g. enterprise-specific ESSIDs), which is described in more detail below in relation to FIGS. 3-10. Further, an AP 190 in private network 104 may be reserved for use as a special provisioning wireless AP to be described later.

Figure 2:
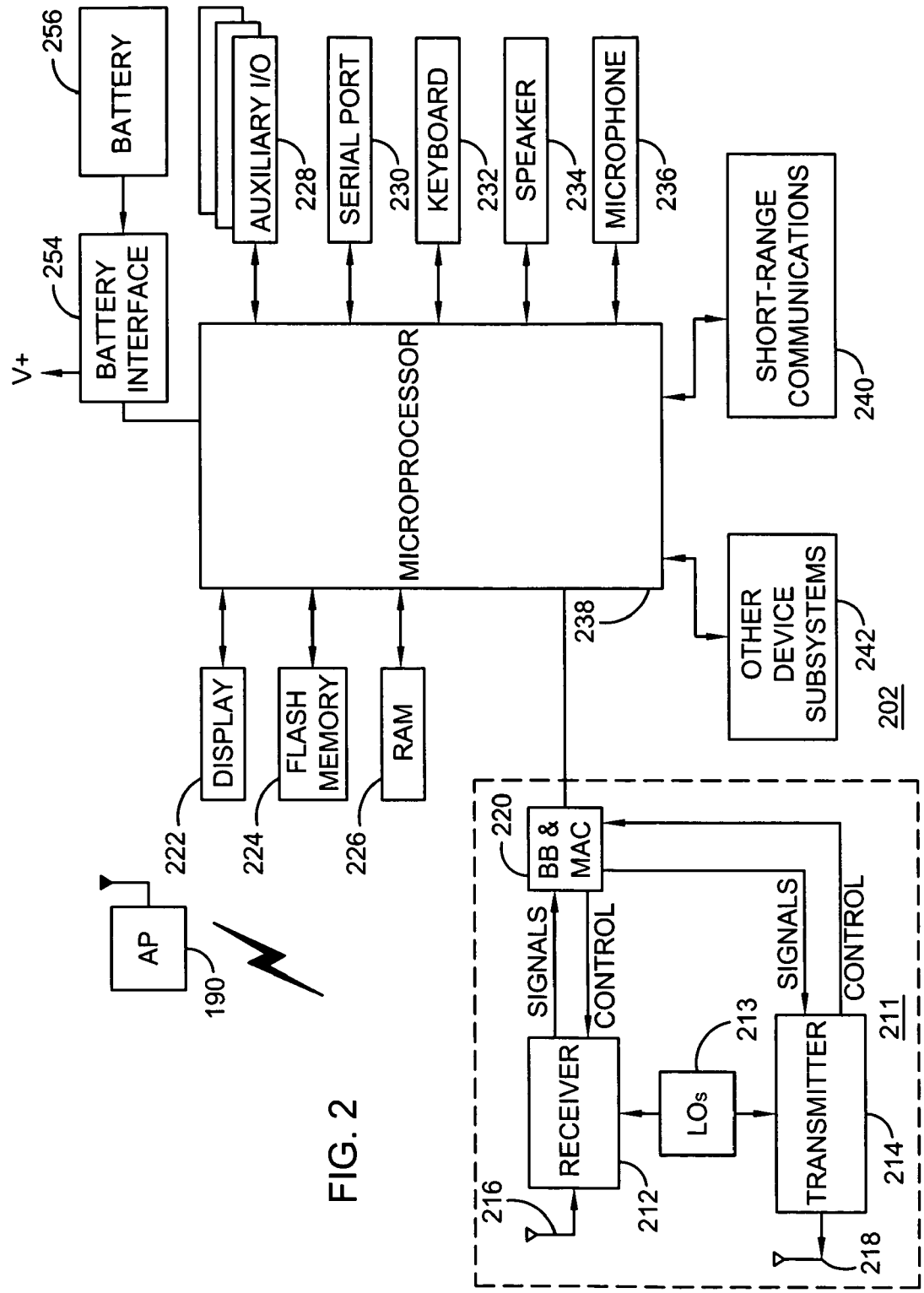
FIG. 2 is a more detailed schematic diagram of the mobile communication devices of FIG. 1, namely, a mobile station of the preferred embodiment.

Referring now to FIG. 2, electrical components of a typical mobile communication device 202 (e.g. a mobile station) which operates with wireless APs of communication system 100 of FIG. 1 will be described. Mobile device 202 may be representative of one or more terminals shown and described in relation to FIG. 1. Mobile device 202 is preferably a two-way communication device having at least voice and advanced data communication capabilities, including the capability to communicate with other computer systems. Also preferably, mobile device 202 is a wireless communication device which operates in accordance with an IEEE 802.11 standards. Depending on the functionality provided by mobile device 202, it may be referred to as a data messaging device, a two-way pager, a cellular telephone with data messaging capabilities, a wireless Internet appliance, or a data communication device (with or without telephony capabilities).

As shown in FIG. 2, mobile device 202 is adapted to wirelessly communicate with wireless APs such as AP 190. For communication with such wireless APs, mobile device 202 utilizes communication subsystem 211. Depending on the type of device, mobile device 202 may also be adapted to wirelessly communicate with other systems such as cellular telecommunication systems. With such configuration, mobile device 202 may be referred to as a "dual mode" mobile device. Although mobile device 202 may have separate and independent subsystems for these purposes, at least some portions or components of these otherwise different subsystems may be shared where possible. Note, however, that the provisioning techniques of the present disclosure do not require that mobile device 202 be any type of dual mode device.

Communication subsystem 211 includes a receiver 212, a transmitter 214, and associated components, such as one or more (preferably embedded or internal) antenna elements 216 and 218, local oscillators (LOs) 213, and a processing module such as a baseband (BB) and media access control (MAC) processing module 220. As will be apparent to those skilled in the field of communications, the particular design of communication subsystem 211 depends on the communication network in which mobile device 202 is intended to operate. In the present disclosure, communication subsystem 211 (including its associated processor/processing components) are operative in accordance with IEEE 802.11 standards.

Mobile device 202 may send and receive communication signals through the network after required network procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in BB/MAC processing module 220. In a similar manner, signals to be transmitted are processed, including modulation and encoding, for example, by BB/MAC processing module 220. These processed signals are input to transmitter 214 for digital-to-analog (D/A) conversion, frequency up conversion, filtering, amplification and transmission through the network via antenna 218. BB/MAC processing module 220 not only processes communication signals, but may also provide for receiver and transmitter control. Note that receiver 212 and transmitter 214 may share one or more antennas through an antenna switch (not shown in FIG. 2), instead of having two separate dedicated antennas 216 and 218 as shown.

Since mobile device 202 may be a portable battery-powered device, it also includes a battery interface 254 for receiving one or more rechargeable batteries 256. Such a battery 256 provides electrical power to most if not all electrical circuitry in mobile device 202, and battery interface 254 provides for a mechanical and electrical connection for it. Battery interface 254 is coupled to a regulator (not shown in FIG. 2) that provides a regulated supply voltage V+ to all of the circuitry.

Mobile device 202 includes a microprocessor 238 (one type of processor or controller) that controls overall operation of mobile device 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile device 202. A predetermined set of applications that control basic device operations, including at least data and voice communication applications, will normally be installed on mobile device 202 during its manufacture. A preferred application that may be loaded onto mobile device 202 may be a personal information manager (PIM) application having the ability to organize and manage data items relating to user such as, but not limited to, e-mail, calendar events, voice mails, appointments, and task items. Naturally, one or more memory stores are available on mobile device 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the wireless device user's corresponding data items stored and/or associated with a host computer system thereby creating a mirrored host computer on mobile device 202 with respect to such items. This is especially advantageous where the host computer system is the wireless device user's office computer system. Additional applications may also be loaded onto mobile device 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile device 202 and may provide enhanced on-device functions, communication-related functions, or both. For example, secure communication applications may enable electronic commerce functions and other such financial transactions to be performed using mobile device 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile device 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211. For voice communications, the overall operation of mobile device 202 is substantially similar, except that the received signals would be output to speaker 234 and signals for transmission would be generated by microphone 236. Alternative voice or audio I/O subsystems, such as a voice message recording subsystem, may also be implemented on mobile device 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile device 202 by providing for information or software downloads to mobile device 202 other than through a wireless communication network. The alternate download path may, for example, be used to load an encryption key onto mobile device 202 through a direct and thus reliable and trusted connection to thereby provide secure device communication. Short-range communications subsystem 240 of FIG. 2 is an additional optional component that provides for communication between mobile device 202 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Although a specific mobile device 202 has just been described, any suitable mobile communication device or terminal may be part of the inventive methods and apparatus which will be described in fuller detail below. Note that many components of mobile device 202 shown and described may not be included.

Figure 3:
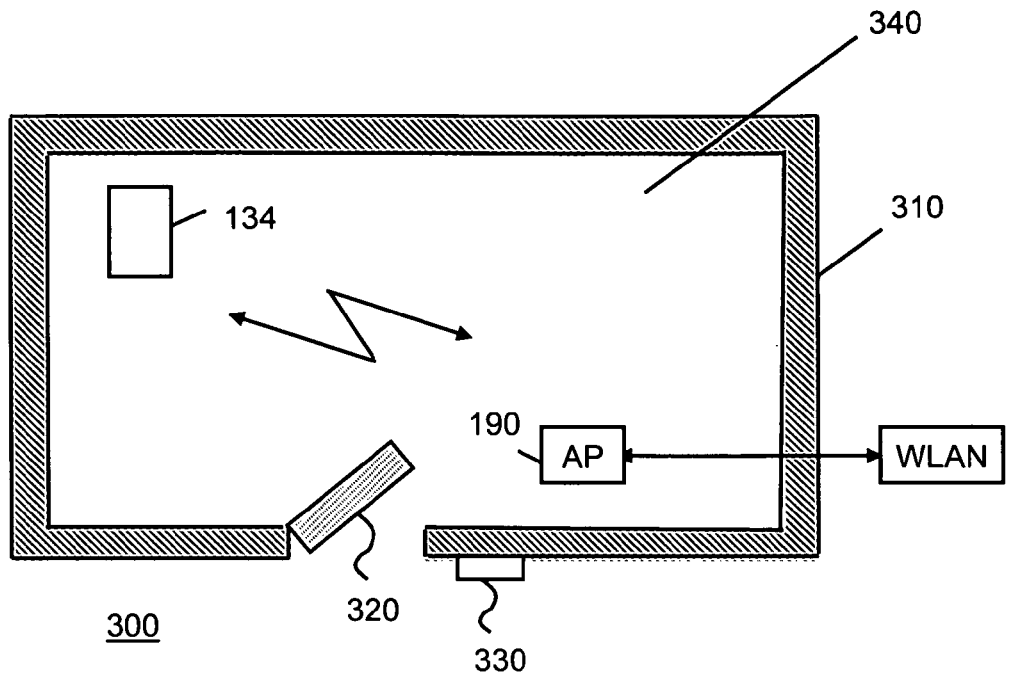
FIG. 3 is a block diagram which illustrates a first technique that utilizes an RF shielded secured room structure for provisioning a mobile communication device with provisioning information from the WLAN via a provisioning wireless AP.

FIG. 3 is a block diagram which illustrates a secure provisioning area 340 within a coverage restriction apparatus 300 for provisioning of a mobile communication device by a wireless network (i.e. WLAN). As shown in FIG. 3, several components are the same as those shown and described in relation to FIG. 1 where reference numerals depict like components. In FIG. 3, a top down view of a wall structure 310 and a secure access entry door 320 connected to wall structure 310 is shown. Both wall structure 310 and entry door 320 are preferably constructed of a conductive electromagnetic shielding material or RF absorption material. When combined with a ceiling and floor (or subfloor) that is preferably constructed of similar conductive electromagnetic shielding or RF absorption material, the total enclosed structure forms one exemplary type of a coverage restriction apparatus 300.

Conductive electromagnetic shielding material of wall structure 310 and entry door 320 may be, for example, copper, silver, gold, nickel or other highly conductive material. RF absorption material may be, for example, some form of commercially-available carbon or other composition that is designed specifically to reduce radiated RF energy at specific or broad frequency ranges. The walls of wall structure 310 may be constructed entirely of the conductive electromagnetic shielding or RF absorption material, be lined with solid layers of the conductive electromagnetic shielding or RF absorption material, or be lined with layers of slotted conductive electromagnetic shielding or RF absorption material. Physical gaps around the door, walls, ceiling and floor must be minimized or omitted by placing flexible gaskets or other devices constructed of similar material to that used in walls, ceiling and floor of coverage restriction apparatus 300. Gaps around coverage restriction apparatus 300 should not exceed a predefined length or width in order to maintain a minimum level of RF shielding or absorption integrity.

Wireless AP 190 is physically located within coverage restriction apparatus 300. Wireless AP 190 is a provisioning wireless AP that is coupled to a public or private WLAN for provisioning purposes. Mobile communications devices located outside coverage restriction apparatus 300 may not be capable of RF communications with any AP or other RF device located within coverage restriction apparatus 300. Preferably, most if not all other wireless APs of the WLAN are not capable of being utilized for provisioning.

Physical entrance to secure provisioning area 340 is achieved by entering through entry door 320 after an authentication procedure. Restricted access of the coverage restriction area is provided by utilizing a security access controller 330 for proper authentication. In this example, wall structure 310, entry door 320 and security access controller 330 together form a secured room structure. Security access controller 330 may be or include a wireless access control unit, a keypad entry control unit (identification and/or password), an electronic push-button or manual key which unlocks entry door 320 by human (e.g. security guard) intervention, or a fingerprint or retina scanner unit, as examples, that controls the opening of entry door 320. In general, a received identification and/or password of the accessing party is compared with a known identification and/or password and, if there is a match, security access controller 330 causes entry door 320 to be unlocked and/or opened; otherwise entry door 320 remains locked and unopened.

The area within the wall structure 310 and entry door 320 represents the secure provisioning area 340. The technique in this example utilizes the electromagnetically shielding or RF absorption properties of coverage restriction apparatus 300 as a method of providing RF coverage security during the provisioning procedure, and the security access 330 to provide restricted access to the secure provisioning area 340. RF communications within coverage restriction apparatus 300 may be limited to mobile communication devices and APs located within coverage restriction apparatus 300. Again, mobile communications devices and APs located outside coverage restriction apparatus 300 may not be capable of RF communications with any device located within coverage restriction apparatus 300.

Once access to secure provisioning area 340 is gained, and a mobile communications device 134 is placed within the secure provisioning area 340, entry door 320 is closed before a secure provisioning procedure is performed. The secure provisioning procedure, such as the one specifically described in relation to the flowcharts of FIGS. 5, 6 and 7, may then be initiated. The provisioning procedure is adapted to provide mobile communication device 134 with provisioning information, programmed or stored in memory, which may be utilized for services within the WLAN. An example of such provisioning information is a network identification or ESSID, but any suitable provisioning information may provided. Once the provisioning procedure is completed, mobile communications device 134 may be removed from the coverage restriction apparatus 300 and subsequently access the WLAN for services.

Figure 4:
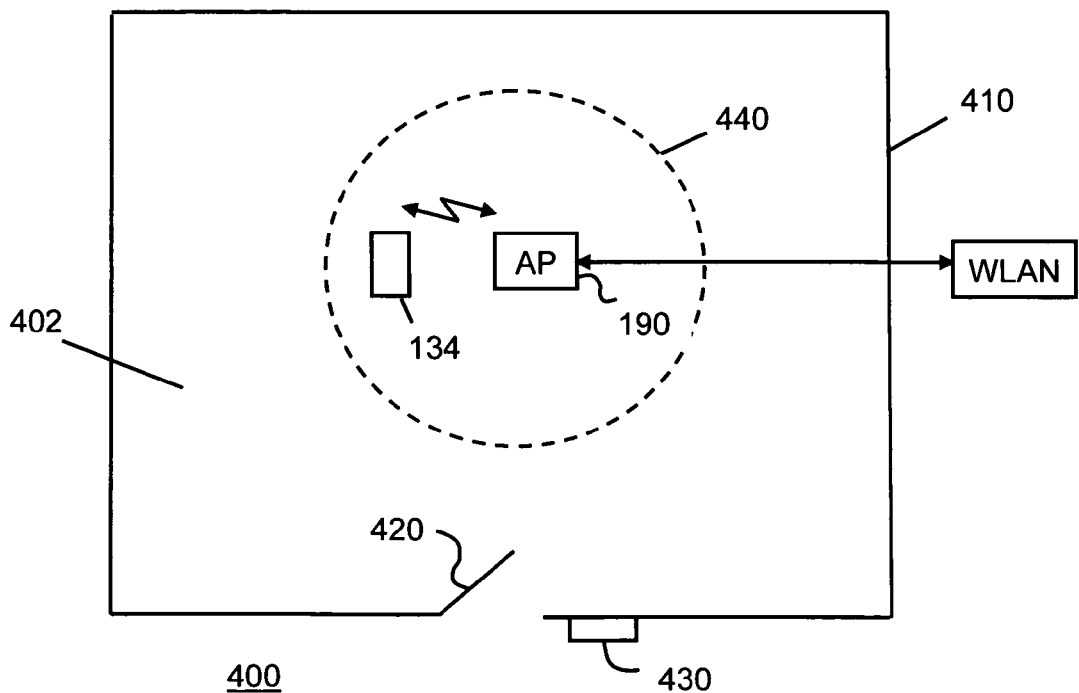
FIG. 4 is a block diagram which illustrates a second technique that utilizes a secured room structure for provisioning a mobile communication device with provisioning information from the WLAN via the provisioning wireless AP.

As another example, FIG. 4 is a block diagram which illustrates a controlled, reduced RF coverage area 440 within a restricted area 402 for provisioning of a mobile communication device within a wireless network (i.e. WLAN). Controlled RF coverage area 440 is a substantially smaller RF coverage area than RF coverage areas of the plurality of wireless APs of the WLAN utilized for normal communication. The combination of controlled RF coverage area 440 and restricted area 402 provide a different type of coverage restriction apparatus 400 than that shown and described in relation to FIG. 3. As shown in FIG. 4, several components are the same as those shown and described in relation to FIG. 1 where reference numerals depict like components.

In particular, FIG. 4 shows a top down view of a wall structure 410 and a secure access entry door 420 connected to wall structure 410. The area surrounded by wall structure 410 and entry door 420 may be covered by a ceiling structure or be constructed of walls or other barriers that extend high enough above the structure's base to prevent entry by means other than by passing through entry door 420. Wall structure 410 is preferably attached securely to a floor (or subfloor) structure or some other means that will prevent access to restricted area 402 other than by passing through entry door 420.

Physical entrance to restricted area 402 is achieved by entering through entry door 420 after an authentication procedure. Restricted access of the coverage restriction area is provided by utilizing a security access controller 430 for proper authentication. In this example, wall structure 410, entry door 420 and security access controller 430 together form a secured room structure. Security access controller 430 may be or include a wireless access control unit, a keypad entry control unit (identification and/or password), an electronic push-button or manual key which unlocks entry door 420 by human (e.g. security guard) intervention, or a fingerprint or retina scanner unit, as examples, that controls the opening of entry door 420. In general, a received identification and/or password of the accessing party is compared with a known identification and/or password and, if there is a match, security access controller 430 causes entry door 420 to be unlocked and/or opened; otherwise entry door 420 remains locked and unopened.

Within restricted area 402 is the controlled RF coverage area 440 that is produced by setting an RF transmit output power level of provisioning wireless AP 190 within a secured room structure. The controlled RF coverage area 440 preferably does not extend beyond any or most boundaries of restricted area 402, indicating that only those mobile communication devices within restricted area 402 would be capable of communicating via RF and obtaining secure provisioning access. Preferably, most if not all other wireless APs of the WLAN are not capable of being utilized for provisioning.

As apparent, the technique in this example utilizes the physical structure and security access controller 430, as well as the controlled RF coverage area 440, for providing coverage security during the provisioning procedure. RF communications within coverage restriction apparatus 300 may be limited to mobile communication devices and APs located within coverage restriction apparatus 400. Mobile communications devices and APs located outside coverage restriction apparatus 400 may not be capable of RF communications with provisioning wireless AP 190 located within coverage restriction apparatus 400.

Figure 5:
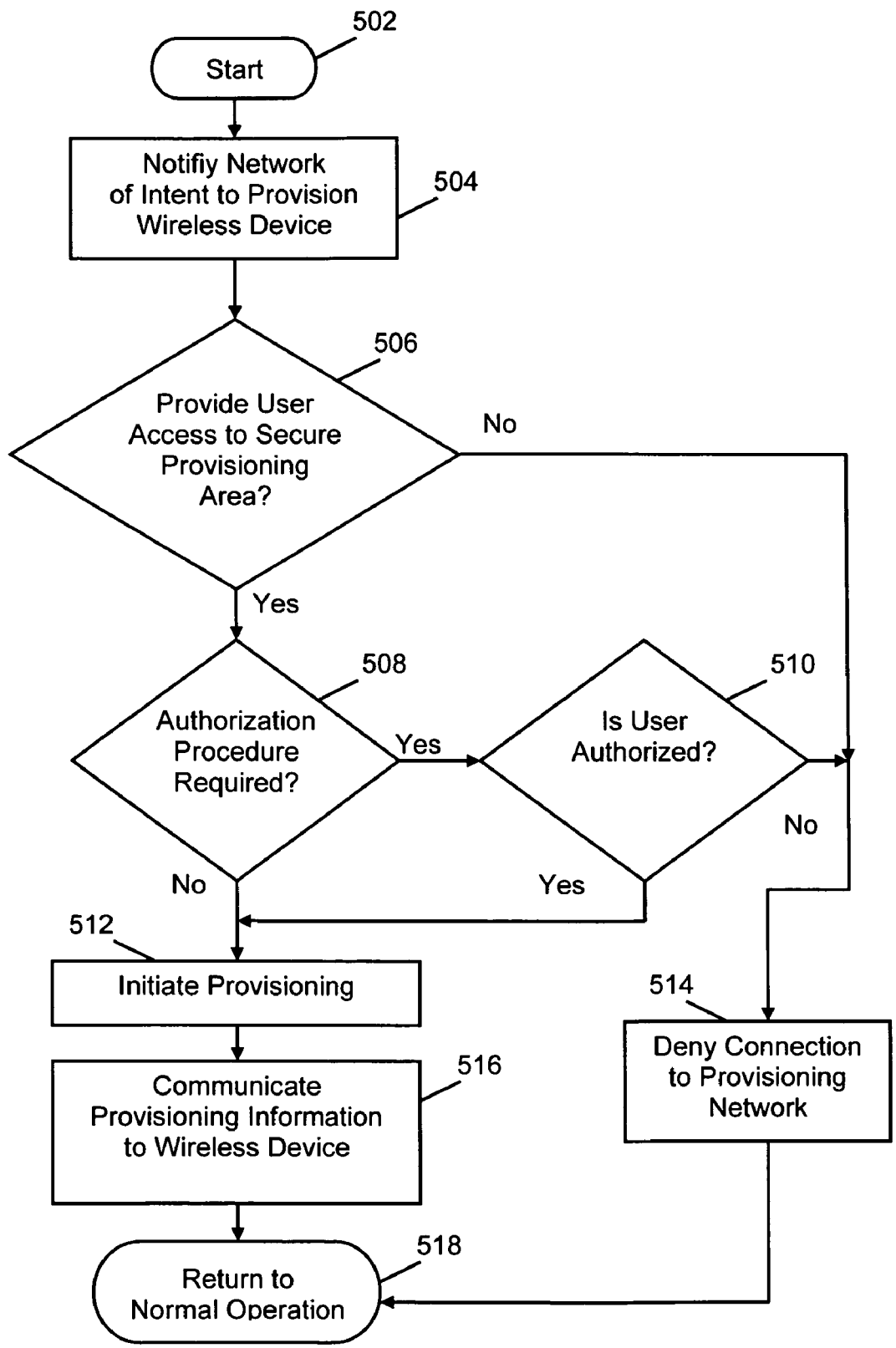
FIG. 5 is a flowchart of a secure provisioning method for a mobile communication device to obtain provisioning information from a WLAN via the provisioning wireless AP.
Figure 6:
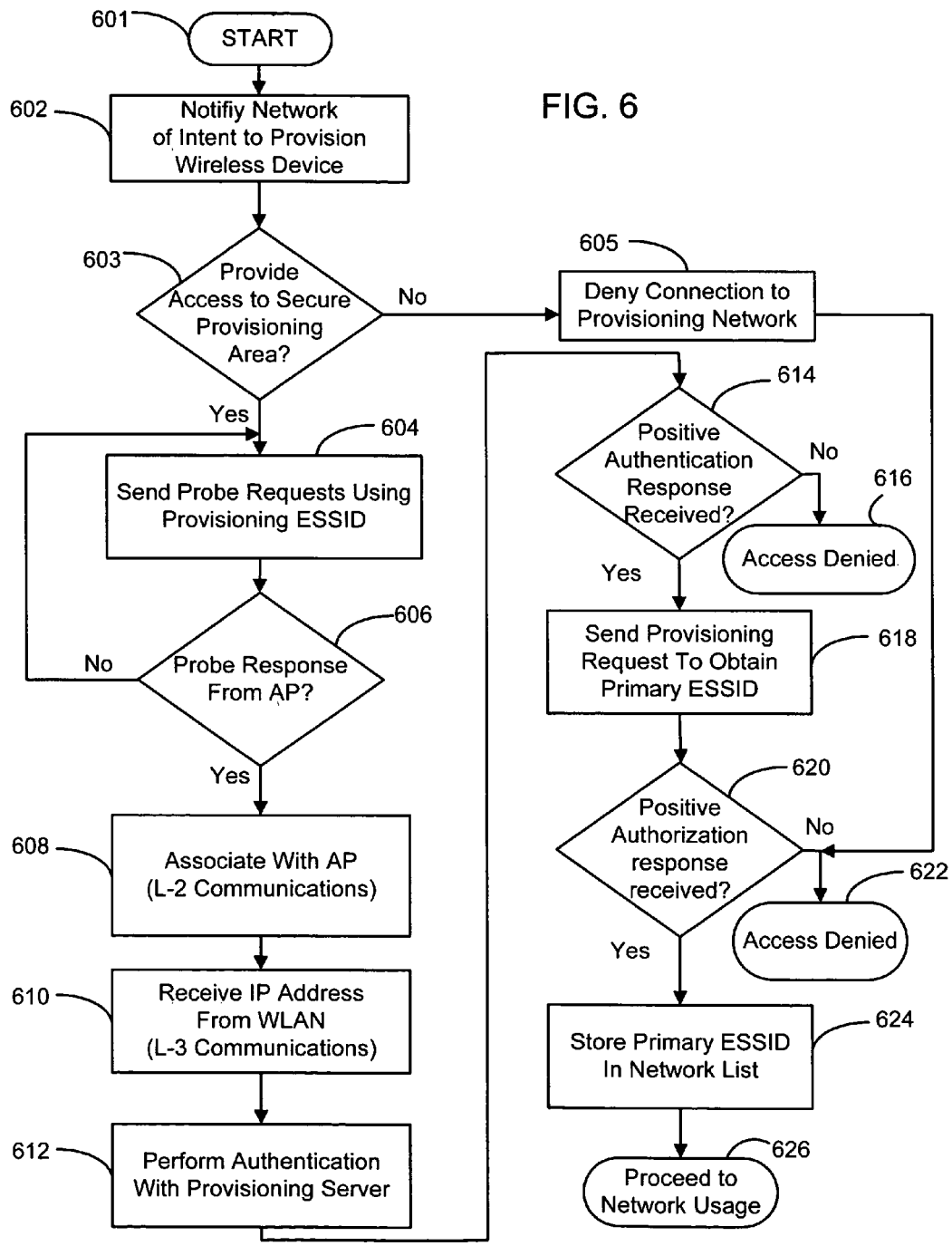
FIG. 6 is a flowchart of a specific secure provisioning procedure for a mobile device to obtain a primary extended set service identification (ESSID) from the WLAN via the provisioning wireless AP.
Figure 7:
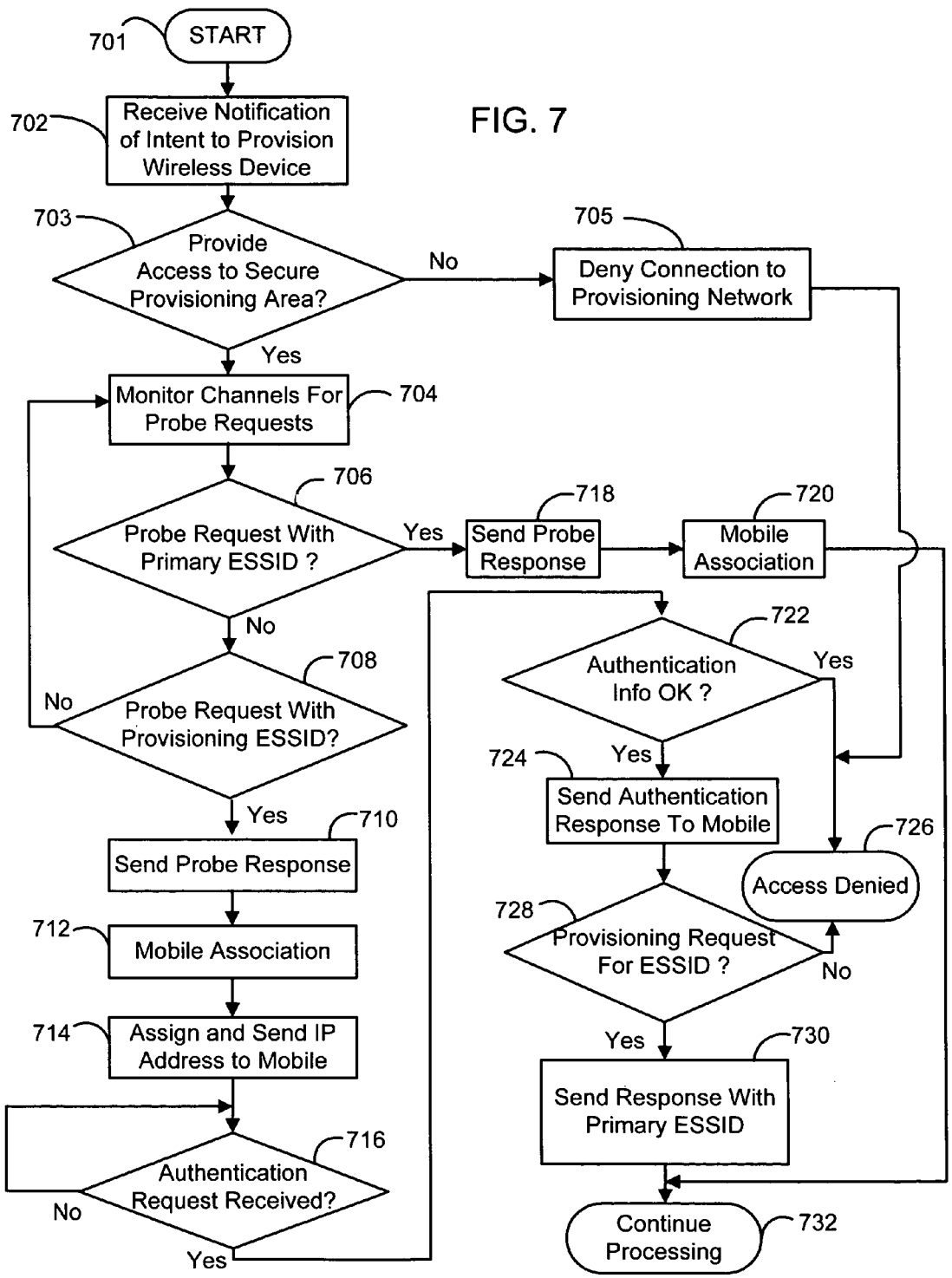
FIG. 7 is a flowchart of a specific provisioning procedure for the provisioning wireless AP to provide the mobile device with the primary ESSID.

Once access to restricted area 402 is gained, and a mobile communications device 134 is placed within the secure provisioning area 440, entry door 420 is closed before a secure provisioning procedure is performed. The secure provisioning procedure, such as the one specifically described in relation to the flowcharts of FIGS. 5, 6 and 7, is then initiated. The provisioning procedure is adapted to provide mobile communication device 134 with provisioning information, programmed or stored in memory, which may utilized for services within the WLAN. An example of such provisioning information is a network identification or ESSID, but any suitable provisioning information may provided. Once the provisioning procedure is completed, mobile communications device 134 may be removed from the coverage restriction apparatus 400 and subsequently access the WLAN for services.

Another technique for providing a secure provisioning method may be a combination of the technique shown in FIG. 3 and that shown in FIG. 4. A conductive electromagnetic shielding or RF absorption enclosure similar to that described for coverage restriction apparatus 300 of FIG. 3 may be used in conjunction with a provisioning wireless AP 190 of FIG. 4 that is transmitting an RF signal at a reduced RF power level to produce a controlled RF coverage area 440 of FIG. 4. Such a technique that utilizes a conductive electromagnetic shielding or RF absorption enclosure and a provisioning wireless AP transmitting at a reduced RF power level would preferably include a security access for achieving restricted access entrance to provide a secure provisioning area.

FIG. 5 is a flowchart of a method for securely provisioning a mobile communication device (e.g. one type of wireless terminal) to provide provisioning information from a wireless communication network (e.g. an 802.11-based wireless local area network (WLAN)) via a provisioning wireless AP, taken from the network perspective. The method of FIG. 5 may be performed at least in part by the WLAN and/or the APs of the WLAN, and/or be embodied in a computer program product which includes a computer readable medium (e.g. memory) and computer instructions stored in the storage medium which are executable by one or more processors. The steps shown in the flowchart of FIG. 5 describe a general process for providing security during a provisioning procedure. The process described in the flowchart shown in FIG. 5 makes use of a coverage restriction apparatus, such as those described previously in relation to FIGS. 3 and 4, and the particular steps and sequence of steps of the method may vary depending on the specific security architecture provided.

The discussion of FIG. 5 may make reference to FIGS. 1, 3, 4 and 5 in combination. Beginning at a start block 502 of FIG. 5 a notification of an intent to provision a mobile communication device is received (step 504 of FIG. 5). At this time, the opportunity for the end user/mobile device to provision the mobile device is identified. If the end user is granted access to the secure provisioning area (e.g. area 340 of FIG. 3 or area 402 of FIG. 4) of the provisioning wireless AP (step 506 of FIG. 5), the then the provisioning process of the flowchart will continue; otherwise any connection for provisioning in the network is denied (step 514 of FIG. 5). The test in step 506 may be performed at least in part with use of a security access controller (e.g. security access controller 330 of FIG. 3 or controller 430 of FIG. 4). The security access controller may be or include a wireless access control unit, a keypad entry control unit (identification and/or password), an electronic push-button or manual key which unlocks an entry door by human (e.g. security guard) intervention, or a fingerprint or retina scanner unit, as examples, that controls the opening of the entry door. In general, a received identification and/or password of the accessing party is compared with a known identification and/or password and, if there is a match, the security access controller causes the entry door to be unlocked and/or opened; otherwise the entry door remains locked and unopened.

If the end user is granted access to the secure provisioning area of the provisioning wireless AP (step 506 of FIG. 5), then the user will enter the restricted area and place the mobile device in a physical location within the secure provisioning area so that the mobile device may communicate via RF signals with the provisioning wireless AP. Using a coverage restriction apparatus of the type in FIG. 3, the mobile device may be placed anywhere within the secure provisioning area 340, assuming AP 190 is transmitting at nominal RF transmit power level and coverage area is less than the open air RF coverage area generated by AP 190. Using a coverage restriction apparatus of the type in FIG. 4, the user must place the mobile device within controlled RF coverage area 440 of provisioning wireless AP 190. Once the mobile device is placed within the coverage area of provisioning wireless AP, the mobile device may then communicate with the provisioning wireless AP to gain access to the WLAN (or provisioning VLAN of the WLAN) and request provisioning services.

The secure provisioning method may then determine if authorization of the mobile device is necessary (step 508 of FIG. 5). If authorization is necessary at step 508, the provisioning equipment will then verify authorization of the mobile device (step 510 of FIG. 5). If authorization fails at step 510, the provisioning procedure is denied (step 514 of FIG. 5) and normal operation will return (step 518 of FIG. 5). Once the mobile device is authorized to access the network at step 510 or if authorization is not necessary at step 508, the provisioning procedure will commence (step 512 of FIG. 5). During the provisioning procedure, the provisioning wireless AP will transfer provisioning information to the mobile device (step 516 of FIG. 5). Provisioning information may be or include network server keys, network identifications, server names and IP addresses, and other sensitive information. Once the provisioning wireless AP has successfully transferred all necessary provisioning information to the mobile device, the mobile device may proceed to utilize the WLAN for services (step 518 of FIG. 5). Note that the optional authorization steps 508 and 510 may be part of the test in step 506 for entrance to the restricted area.

FIG. 6 is a flowchart of a secure method for provisioning a mobile communication device with specific provisioning information, namely a primary extended service set identifier (ESSID), from a wireless communication network (e.g. an 802.11-based wireless local area network (WLAN)), taken from the mobile device perspective. The method of FIG. 6 may be performed by the mobile device, and/or be embodied in a computer program product which includes a computer readable medium (e.g. memory) and computer instructions stored in the computer readable medium which are executable by one or more processors. The flowchart of FIG. 6 will be discussed in combination with the components of the communication system of FIG. 1 and the secure access diagrams in FIGS. 3 and 4.

Before describing the flowchart of FIG. 6 in detail, it is noted that a primary virtual local area network (VLAN) of the WLAN is adapted to provide one or more services (e.g. VoIP or other communication services) for the mobile device. The WLAN may have one or more primary ESSIDs associated with one or more different VLANs of the WLAN which permit access to different services from each other. In order to obtain a primary ESSID to gain access to such services, the mobile device is adapted to perform a wireless network provisioning procedure with the WLAN. Specifically, the mobile device makes use of a provisioning ESSID associated with a provisioning VLAN of the WLAN for the provisioning procedure. The provisioning VLAN is adapted to perform the provisioning procedure with the mobile device, but otherwise allows for limited or no other services in the WLAN for the mobile device. The provisioning ESSID may be, for example, a predetermined fixed ESSID utilized for all mobile devices (i.e. the same fixed ESSID) which is stored in memory. The provisioning ESSID is used initially by the mobile device to associate with an AP of the provisioning VLAN (i.e. the provisioning wireless AP within the secured area) in order to subsequently receive and store a primary ESSID associated with the primary VLAN of the WLAN. The mobile device may then use conventional or other techniques for associating with APs of the primary VLAN using this primary ESSID.

Beginning at a start block 601 of FIG. 6, a notification of an intent to provision a mobile communication device is received (step 602 of FIG. 6). At this time, the opportunity for the end user/mobile device to provision the mobile device is identified. If the end user is granted access to the secure provisioning area of the provisioning wireless AP (step 506 of FIG. 5), then the provisioning process of the flowchart will continue; otherwise any connection for provisioning in the network is denied (step 605 of FIG. 6). The test in step 603 may be performed at least in part with use of a security access controller (e.g. security access controller 330 of FIG. 3 or controller 430 of FIG. 4). The security access controller may be or include a wireless access control unit, a keypad entry control unit (identification and/or password), an electronic push-button or manual key which unlocks an entry door by human (e.g. security guard) intervention, or a fingerprint or retina scanner unit, as examples, that controls the opening of the entry door. In general, a received identification and/or password of the accessing party is compared with a known identification and/or password and, if there is a match, the security access controller causes the entry door to be unlocked and/or opened; otherwise the entry door remains locked and unopened.

If the end user is granted access to the secure provisioning area of the provisioning wireless AP (step 603 of FIG. 5), then the user will enter the restricted area and place the mobile device in a physical location within the secure provisioning area so that the mobile device may communicate via RF signals with the provisioning wireless AP. Using a coverage restriction apparatus of the type in FIG. 3, the mobile device may be placed anywhere within the secure provisioning area 340, assuming provisioning wireless AP 190 is transmitting at nominal RF transmit power level and coverage area is less than the open air RF coverage area generated by the AP. Using a coverage restriction apparatus of the type in FIG. 4, the user must place the mobile device within controlled RF coverage area 440 of provisioning wireless AP 190. Once the mobile device is placed within the coverage area of provisioning wireless AP, the mobile device may then communicate with the provisioning wireless AP to gain access to the WLAN (or provisioning VLAN of the WLAN) and request provisioning services.

The provisioning procedure is initiated when the mobile device is located within an RF coverage area of the provisioning wireless AP. When the mobile device is operating, it searches for access points within its coverage range. Next, the mobile device sends one or more probe requests using its provisioning ESSID (step 604 of FIG. 6). In this step, the mobile device may use 802.11 management frames known as probe request frames to send the probe requests. Specifically, the mobile device sends probe requests on every channel that it supports in an attempt to find all access points in range that match the provisioning ESSID. The mobile device sends these requests to the provisioning wireless AP by performing programmed algorithms within its microprocessor and/or MAC/BB processor (FIG. 2). Next, the mobile device monitors to receive probe response commands from the provisioning wireless AP and other APs within the range of the mobile device (step 606 of FIG. 6). If no association can be made using the provisioning ESSID, no probe responses will be received by the mobile device. In this case, the mobile device will continue the sending of probe requests using the provisioning ESSID (step 604) and monitoring for probe requests from APs (step 606). Once a probe response is properly received from the provisioning wireless AP in step 606, the mobile device will associate with the AP for communications (step 608 of FIG. 6). This step establishes layer-2 communications between and the mobile device and the WLAN. As an alternative to the probe request/response protocol of steps 604 and 606, some APs may regularly broadcast the provisioning ESSIDs in "beacons." In this case, the mobile device would compare the provisioning ESSID broadcasted by the AP with its own provisioning ESSID and, if there is a match, associate with the AP of the provisioning VLAN.

After the mobile device associates with the provisioning wireless AP in step 608, the mobile device monitors to receive an Internet Protocol (IP) address from the WLAN (step 610 of FIG. 6). The IP address may be dynamically assigned by the network, for example, with use of an address assignor (e.g. address assignor 120 of FIG. 1) which may be a dynamic host configuration protocol (DHCP) server. This establishes layer-3 communications between the mobile device and the WLAN.

Once the mobile device properly receives the assigned IP address from the DHCP server, the mobile device performs an authentication procedure with a provisioning server (provisioning server 128 of FIG. 1) of the provisioning VLAN (step 612 of FIG. 6). Previously, the mobile device may receive a network address of the provisioning server from the provisioning wireless AP so that the authentication procedure with the provisioning server may be initiated. Given that secure access has already been provided, the authentication steps 612 and 614 are optional. In the authentication procedure, the mobile device sends authentication information (e.g. network password, fingerprint data, or the like) to the provisioning server. The authentication information may be unique to each WLAN or terminal. The mobile device then monitors to receive an authentication response from the provisioning wireless (step 614 of FIG. 6). The authentication response may indicate to the mobile device that authentication is denied for that WLAN (e.g. where network password is incorrect). If authentication is denied by the WLAN, association between the mobile device and the provisioning wireless AP will be aborted (step 616 of FIG. 6).

Once the mobile device has received a positive authentication response from the provisioning wireless AP, it is understood that it has gained network access for provisioning that it desires. In response to the positive authentication from the AP at step 614, the mobile device will send a provisioning request for an ESSID to provisioning server 128 to obtain a primary ESSID of the primary VLAN of the WLAN (step 618 of FIG. 6). The mobile device then monitors to receive a response from the provisioning wireless AP (step 620 of FIG. 6). The response may indicate to the mobile device that the request is denied and, if so, access to the WLAN is denied and association between the mobile device and AP 190 may be aborted (step 622 of FIG. 6). If a positive response is received at step 620, the primary ESSID (e.g. the enterprise-specific ESSID) of the primary VLAN of the WLAN is wirelessly received from the provisioning VLAN and programmed or stored in an internal network list in memory of the mobile device (step 624 of FIG. 6). During this timeframe, the mobile device may also receive additional information, such as network access security keys and network server names/addresses for a VoIP server, a SIP server, and an e-mail server, as examples. Once the primary ESSID and any other information are obtained and stored in memory, the mobile device may proceed to utilize the primary VLAN of the WLAN for services (step 626 of FIG. 6).

FIG. 7 is a flowchart for describing an illustrative method of a secure wireless network provisioning procedure from the network perspective. Again in this example, provisioning information, namely a network identification or ESSID, is provisioned in the mobile device. The method of FIG. 7 may be performed by equipment of the WLAN, and/or be embodied in a computer program product which includes a computer readable medium (e.g. memory) and computer instructions stored in the storage medium which are executable by one or more processors.

Prior to discussing FIG. 7 in detail, note again that the WLAN has a primary VLAN which is associated with a primary network identifier (i.e. the primary ESSID) and a provisioning VLAN of the WLAN which is associated with a provisioning network identifier (i.e. the provisioning ESSID) and includes a provisioning server. The primary VLAN of the WLAN is adapted to provide one or more services (e.g. VoIP or other communication services) for the mobile device. The WLAN may, in fact, have one or more primary ESSIDs associated with one or more different VLANs of the WLAN which permit access to different services from each other. On the other hand, the provisioning VLAN is adapted to perform the provisioning procedure with the mobile device, but otherwise allows for limited or no other services in the WLAN for the mobile device. The provisioning ESSID may be a predetermined fixed ESSID utilized for all mobile devices (i.e. the same fixed ESSID) which is stored in memory. The provisioning ESSID is used initially by the mobile device to associate with an AP of the provisioning VLAN (i.e. the provisioning wireless AP within the secured area) in order to subsequently receive and store the primary ESSID associated with the primary VLAN of the WLAN. The mobile device may then use conventional or other techniques for associating with APs of the primary VLAN using the primary ESSID.

The discussion of FIG. 7 may make reference to both FIGS. 1, 3, 4 and 7 in combination. Beginning at a start block 701 of FIG. 7, a notification of an intent to provision a mobile communication device is received (step 702 of FIG. 7). At this time, the opportunity for the end user/mobile device to provision the mobile device is identified. If the end user is granted access to the secure provisioning area (e.g. area 340 of FIG. 3 or area 402 of FIG. 4) of the provisioning wireless AP (step 703 of FIG. 7), then the provisioning process of the flowchart will continue; otherwise any connection for provisioning in the network is denied (step 705 of FIG. 7). The test in step 703 may be performed at least in part with use of a security access controller (e.g. security access controller 330 of FIG. 3 or controller 430 of FIG. 4). The security access controller may be or include a wireless access control unit, a keypad entry control unit (identification and/or password), an electronic push-button or manual key which unlocks an entry door by human (e.g. security guard) intervention, or a fingerprint or retina scanner unit, as examples, that controls the opening of the entry door. In general, a received identification and/or password of the accessing party is compared with a known identification and/or password and, if there is a match, the security access controller causes the entry door to be unlocked and/or opened; otherwise the entry door remains locked and unopened.

If the end user is granted access to the secure provisioning area of the provisioning wireless AP (step 703 of FIG. 5), then the user will enter the restricted area and place the mobile device in a physical location within the secure provisioning area so that the mobile device may communicate via RF signals with the provisioning wireless AP. Using a coverage restriction apparatus of the type in FIG. 3, the mobile device may be placed anywhere within the secure provisioning area 340, assuming provisioning wireless AP 190 is transmitting at nominal RF transmit power level and coverage area is less than the open air RF coverage area generated by the AP. Using a coverage restriction apparatus of the type in FIG. 4, the user must place the mobile device within controlled RF coverage area 440 of provisioning wireless AP 190. Once the mobile device is placed within the coverage area of provisioning wireless AP 190, the mobile device may then communicate with the AP to gain access to the WLAN (or provisioning VLAN of the WLAN) and request provisioning services.

Next, the provisioning wireless AP monitors its RF channels for probe requests from mobile devices (step 704 of FIG. 7). In this step, probe requests are received in 802.11 management frames known as probe request frames. The mobile device sends probe requests on every channel that it supports in an attempt to find all access points in range that have the provisioning ESSID. If a probe request having the primary ESSID of the primary VLAN is received (step 706 of FIG. 7), then the flowchart continues through steps 718 and 720 which is described later. If the probe request does not have the primary ESSID (step 706) but rather includes the provisioning ESSID (step 708 of FIG. 7), then the provisioning wireless AP sends a probe response to the mobile device (step 710 of FIG. 7) and the mobile devices associates with the AP (step 712 of FIG. 7). This establishes layer-2 communications between the mobile device and the WLAN. As an alternative to the probe request/response protocol, some APs may regularly broadcast the provisioning ESSIDs in "beacons." In this case, the mobile device would compare the provisioning ESSID broadcasted by the provisioning wireless AP with its own provisioning ESSID and, if there is a match, associate with it.

After the mobile device associates with the provisioning wireless AP in step 608, the network assigns and sends an Internet Protocol (IP) address to the mobile device (step 714 of FIG. 7). The IP address may be dynamically assigned by the network, for example, with use of an address assignor (e.g. address assignor 120 of FIG. 1) which may be a dynamic host configuration protocol (DHCP) server. This establishes layer-3 communications between the mobile device and the WLAN. Sometime after the WLAN sends the assigned IP address from the DHCP server in step 714, the provisioning server (provisioning server 128 of FIG. 1) of the provisioning VLAN performs an authentication procedure with the mobile device. Here, authentication request and authentication information is received from the mobile device (step 716 of FIG. 7). The provisioning wireless AP may send a network address of the provisioning server to the mobile device so that the authentication procedure with the provisioning server may be initiated. The authentication information may be unique to each WLAN or terminal, and may include a network password, fingerprint data, or the like.

The authentication response may indicate to the mobile device that authentication is denied for that WLAN (e.g. where network password is incorrect) (step 726 of FIG. 7). If authentication is denied by the WLAN, association between the mobile device and the provisioning wireless AP may be aborted. If the authentication information is correct at step 722, then it is understood that the mobile device has gained network provisioning access for provisioning. After a positive authentication from the provisioning wireless AP at step 724, the provisioning VLAN receives a provisioning request for an ESSID from the mobile device to receive a primary ESSID of the primary VLAN of the WLAN (step 728 of FIG. 7). If not, access to the WLAN is denied (step 724 of FIG. 7) and association between the mobile device and the provisioning wireless AP may be aborted. After receiving the provisioning request in step 728, the provisioning VLAN causes the primary ESSID (e.g. the enterprise-specific ESSID) of the primary VLAN of the WLAN to be wirelessly transmitted from the provisioning wireless AP to the mobile device (step 730 of FIG. 7). This primary ESSID is stored in an internal network list in memory of the mobile device. During this timeframe, the WLAN may also send additional information, such as network access security keys and network server names/addresses for a VoIP server, a SIP server, and an e-mail server, as examples. Once the primary ESSID and any other information are sent by the provisioning VLAN and stored in memory of the mobile device, the primary VLAN of the WLAN may provide services to the mobile device where it utilizes the primary ESSID for association with APs of the WLAN (step 732 of FIG. 7).

Figure 8:
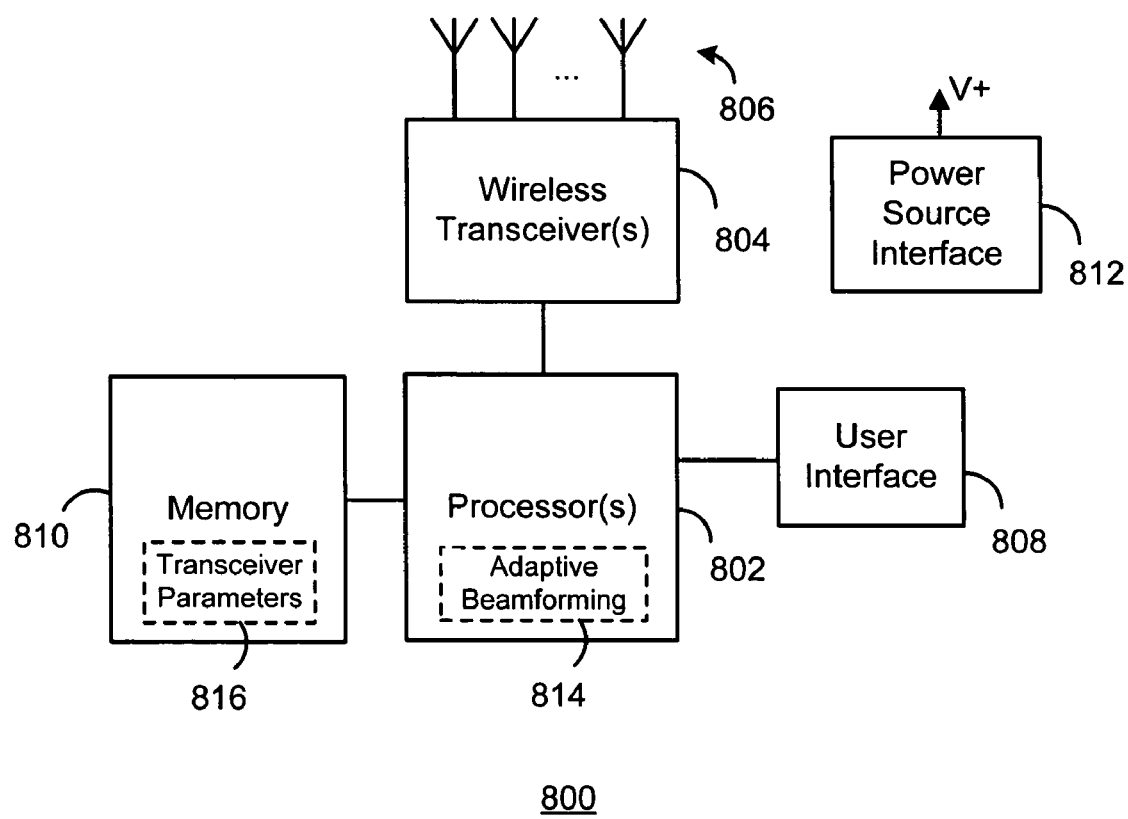
FIG. 8 is a schematic block diagram of basic components of a provisioning wireless AP which may serve as an RF coverage shaping mechanism in the WLAN to provide a technique for securely provisioning a mobile communication device with provisioning information from the WLAN.
Figure 9:
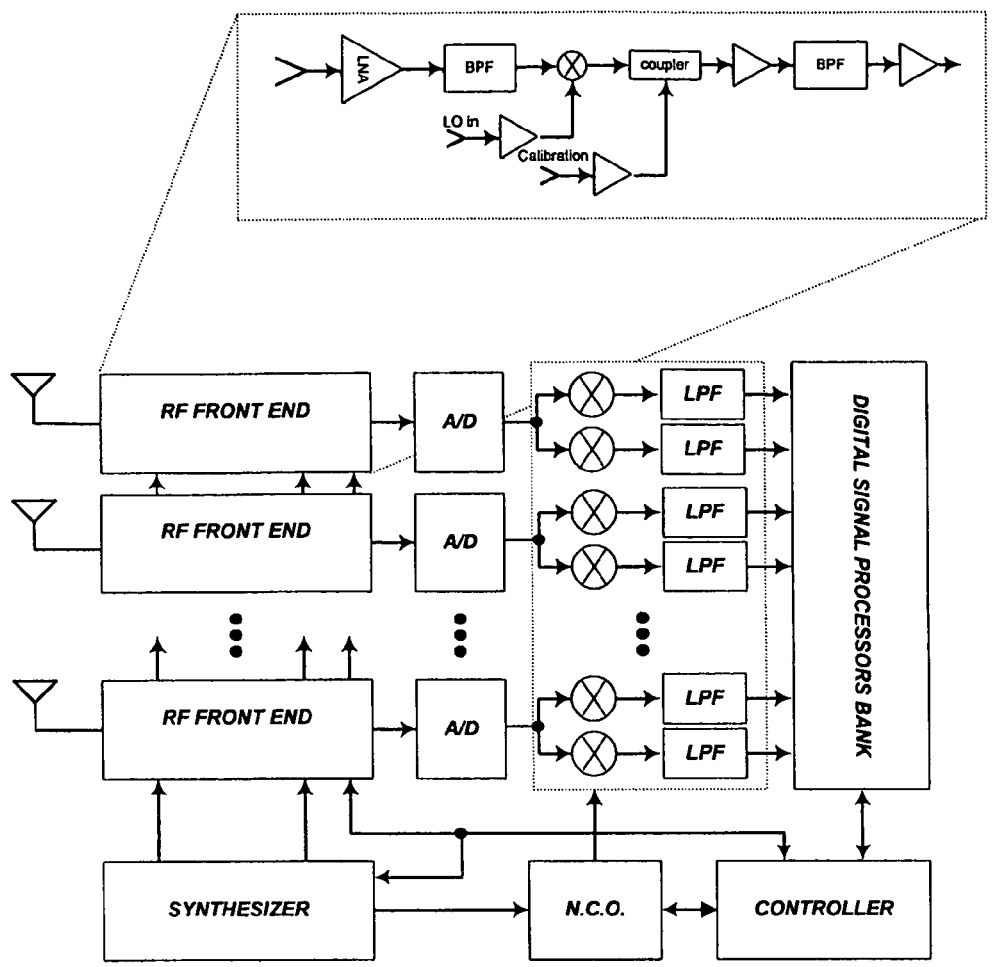
FIG. 9 is a schematic diagram of wireless transceiver components of the provisioning wireless AP of FIG. 8 which are adapted to perform an RF coverage shaping technique for the secure provisioning of a mobile communication device with provisioning information.

Moving ahead, FIGS. 8 and 9 describe an adaptive beamforming method that may be used to further reduce or restrict an RF coverage area within a secured room structure such as those shown in FIGS. 3 and 4. The adaptive beamforming communications equipment may be located within a secured room structure similar to those shown in FIGS. 3 and 4. In a secured room structure, walls and doors used to provide restricted access to a secured room structure may or may not be conductive depending on security requirements for the provisioning area. In general, during a configuration procedure for the provisioning wireless AP, RF signals to and from a plurality of communication devices are transmitted and received by the AP. The plurality of communication devices include a first group of communication devices located within an RF coverage boundary of a desired provisioning coverage region. The plurality of communication devices also include a second group of communication devices located along and outside the RF coverage boundary of the desired provisioning coverage region. Parameters of a wireless transceiver of the provisioning wireless AP are determined and set to adjust boundaries of an RF coverage region, such that RF signal coverage of the first group of communication devices is maximized but RF signal coverage of the second group of communication devices is minimized. Preferably, the parameters of the wireless transceiver are determined through use of an adaptive beamforming technique which is performed automatically by the wireless AP without user intervention.

More particularly in FIG. 8, a schematic block diagram of basic components of a provisioning wireless AP 800 which serves as an RF coverage shaping mechanism in the WLAN is shown. Wireless AP 800 is further adapted to perform part of a configuration procedure with use of an adaptive beamforming technique. As shown in FIG. 8, wireless AP 800 includes a processor 802 (e.g. a microprocessor, microcontroller, and/or digital signal processor), memory 810 coupled to processor 802, a wireless transceiver 804 coupled to processor 802, an antenna array 806 coupled to wireless transceiver 804, a user interface 812 coupled to processor 802, and a power source interface 814. Although only one processor 802 and only one wireless transceiver 804 are shown in FIG. 8, processor 802 may be embodied as two or more processors (e.g. microprocessor and DSP) and wireless transceiver 804 may be embodied as two or more wireless transceiver portions. Power source interface 814 supplies power to all electrical components of wireless AP 800 by interfacing with a power source (e.g. AC power, battery, and/or solar power).

Processor 802 of wireless AP 800 includes an adaptive beamforming process 814 which helps determine transceiver parameters 816 for wireless transceiver 804 which are stored in memory 810. Adaptive beamforming process 814 may be embodied as computer instructions which are executable by processor 802: Transceiver parameters 816 are used by wireless AP 800 to establish its RF coverage region when it serves as the provisioning mechanism in the WLAN (or the provisioning VLAN of the WLAN). A set of transceiver parameters 816 may be stored for each frequency or frequency pair associated with all of the usable frequency channels of the relevant RF band for RF communications. The basic components of wireless AP 800 of FIG. 8 may be particularly utilized. User interface 812, which may be or include user actuable switches or keys (e.g. directly on a housing of wireless AP 800 or through a computer terminal (e.g. PC) connected to wireless AP 800), for example, may be utilized to initiate the configuration procedure and adaptive beamforming process 814. That is, the configuration procedure/adaptive beamforming technique of wireless AP 800 may be initiated in response to a user interface signal from user interface 812.

Showing more exemplary detail, FIG. 9 is a schematic diagram of wireless transceiver components 900 of the wireless AP which are adapted to perform an adaptive beamforming technique for configuration of the wireless AP. In the example of FIG. 9, the receiver portion is shown but the transmitter portion may utilize a similar approach. In FIG. 9, wireless transceiver components 900 include an antenna array having a plurality of antennas, where each antenna is coupled to a separate corresponding RF front end component. A frequency synthesizer, which receives a fixed oscillator frequency signal from an oscillator ("NCO"), is coupled to each RF front end component. Each RF front end component has an output coupled to an input of an analog-to-digital converter (A/D), which has an output coupled to signal demodulators (which include signal mixers) and subsequent low pass filters. Outputs from the low pass filters are coupled to inputs of a digital signal processor (DSP). The controller serves to control the adaptive beamforming process for producing transceiver parameters in the configuration procedure for the DSP. Note that there are many different types of adaptive beamforming algorithms, conventional or otherwise, which may be utilized within the wireless AP. With adaptive beamforming, each RF signal is multiplied with complex weights that adjust a magnitude and a phase of the RF signal to and from each antenna in the antenna array. This causes the output from the antenna array to form a transmit/receive beam in the desired direction, while minimizing the output in other directions. The application of complex weights to the RF signals from different antennas of the antenna array involves complex multiplications that may map onto embedded DSP blocks of the DSP.

Figure 10:
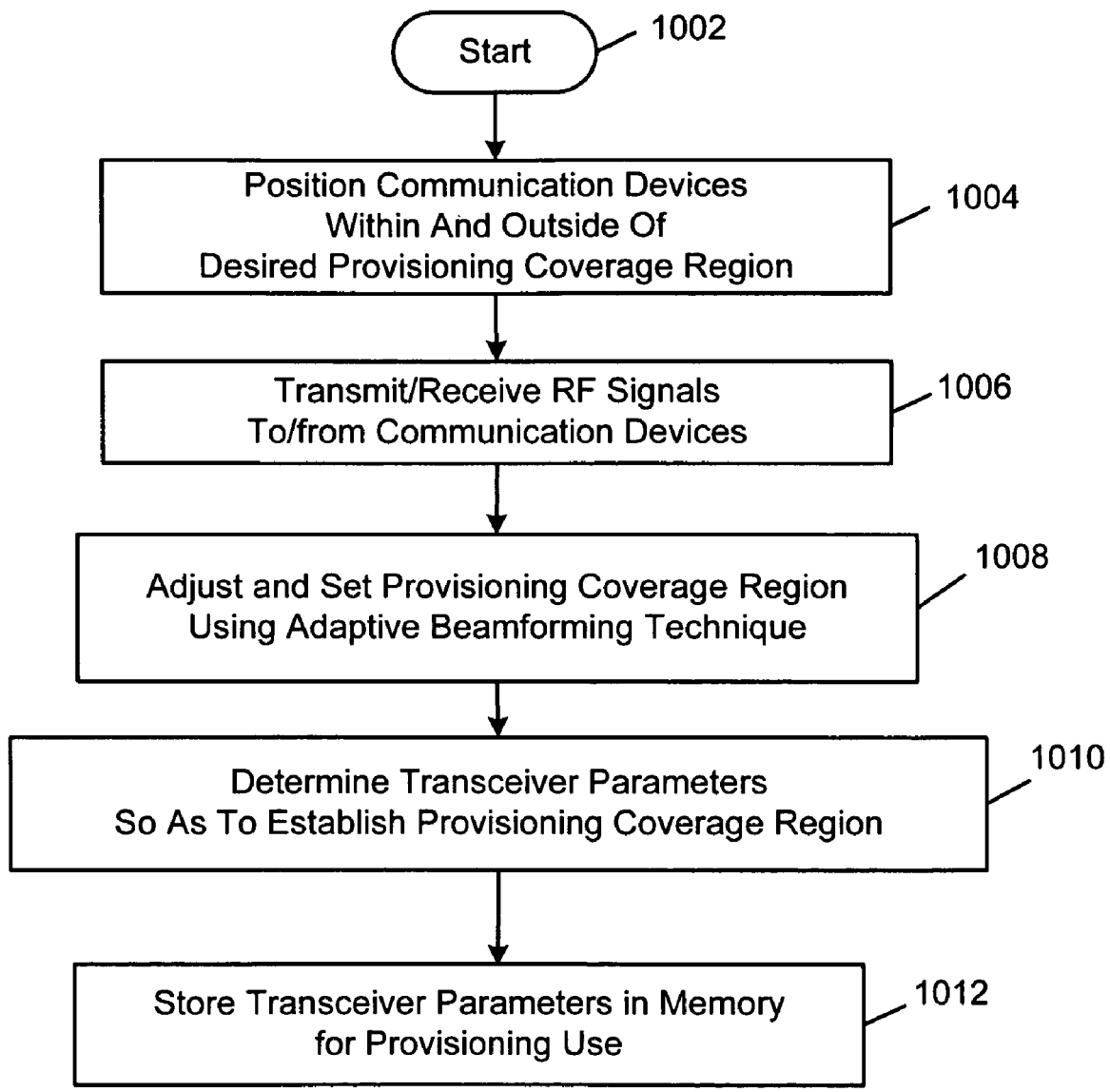
FIG. 10 is a flowchart for describing a method for use in configuring the provisioning wireless AP with use of the RF coverage shaping mechanism.

Referring now to FIG. 10, a flowchart of a method of configuring the provisioning wireless AP for use as the provisioning mechanism in the WLAN is shown. The following description of FIG. 10 relates to the description of FIGS. 8-9 above. The method of FIG. 10 may be embodied at least in part as a computer program product which includes a computer readable medium and computer instructions stored in the computer readable medium which are executable by one or more processors of the wireless AP for performing the method. After its initiation, the technique is performed automatically by the one or more processors without further user intervention.

Beginning at a start block 1002 of FIG. 10, a plurality of mobile communication devices for the configuration procedure are provided and fixedly positioned around a desired RF provisioning coverage region of the provisioning wireless AP both within and outside of the region (step 1004 of FIG. 10). Specifically, a first group of mobile devices is located within and around RF provisioning coverage boundaries of the desired RF provisioning coverage region of the WLAN. A second group of mobile devices is located along and outside the RF coverage boundaries of the provisioning coverage region. The positioning of the mobile devices is performed by one or more individuals, with or without the assistance of any other WLAN feedback signal mechanisms if necessary.

After mobile device positioning, radio frequency (RF) signals to/from the mobile devices are transmitted/received by the wireless AP (step 1006 of FIG. 10). An RF signal coverage region of the wireless AP is then adjusted and set based on the RF signals using an adaptive beamforming technique (step 1008 of FIG. 10). Specifically, transceiver parameters of the wireless transceiver of the wireless AP are adjusted and set such that RF signal coverage of the first group of mobile devices is maximized but RF signal coverage of the second group of mobile devices is minimized (step 1010 of FIG. 10). The RF signals from each mobile device may include a mobile device identifier which uniquely identifies the mobile device, amongst other data. Mobile device identifiers may also be stored in memory of the wireless AP, and assigned or associated in advance with an indication corresponding to either one group (e.g. within desired provisioning coverage) or another group (e.g. outside of desired provisioning coverage). The wireless AP determines which RF signals should be maximized or minimized based on the mobile device identifier associated with the RF signal and the indication (received and/or stored in memory) of whether the mobile device should or should not be within the AP tripwire coverage. Once the transceiver parameters are obtained, they are stored in memory for use by the wireless AP tripwire (step 1012 of FIG. 10).

Figure 11:
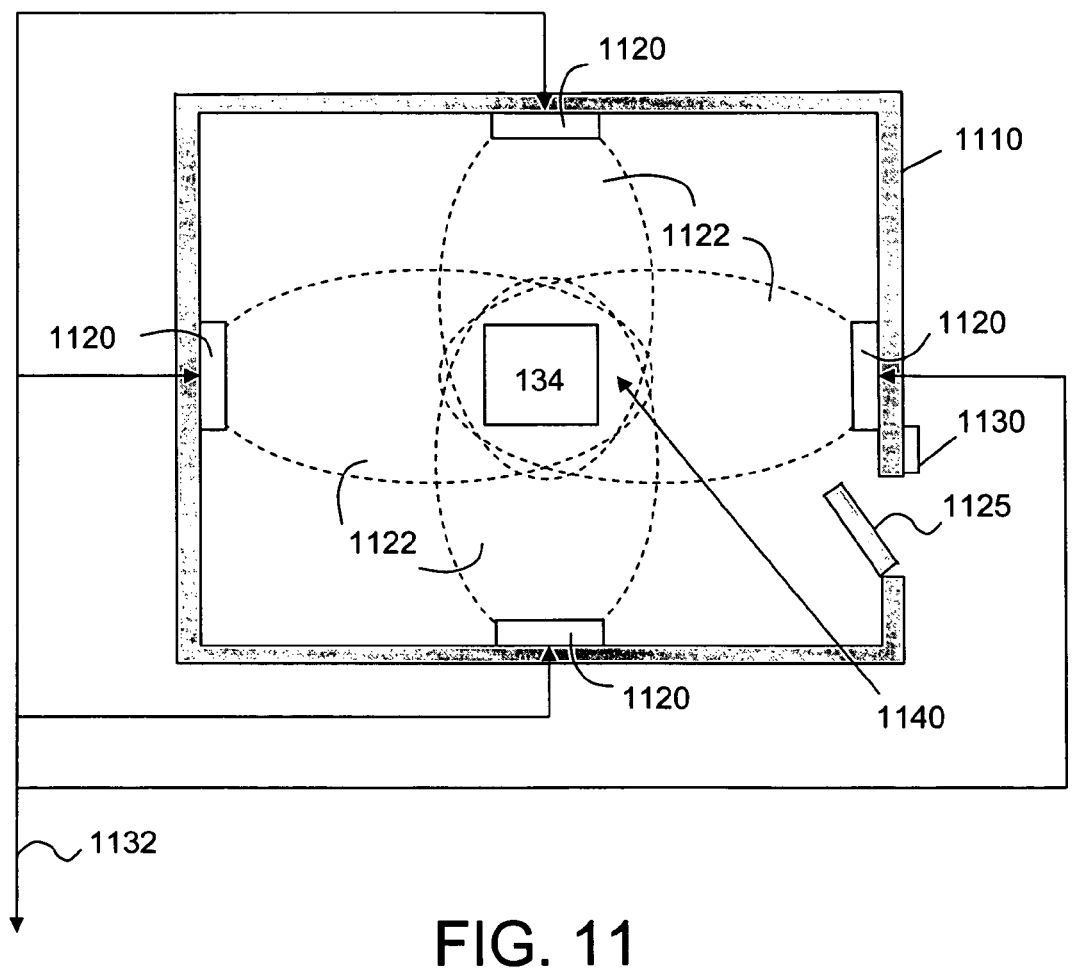
FIG. 11 is a block diagram which illustrates another technique for provisioning a mobile communication device with provisioning information from a WLAN within a secured room structure.

Yet even another technique that may be used to control RF coverage area within a secured room structure, which would provide a secure provisioning area, is shown in the block diagram in FIG. 11. A wall structure 1110 and an entry door 1125 provide restricted access to a controlled RF coverage area 1140 that is surrounded by wall structure 1110 and entry door 1125. The controlled, restricted RF coverage area 1140 is preferably a substantially smaller RF coverage area than RF coverage areas of the plurality of wireless APs of the WLAN. Access to the secure provisioning area may be by use of a secure entry controller 1130, which may be in the form described earlier, for controlling entry door 1125. The controlled RF coverage area 1140 may be a function of two or more RF radiation lobes 1122. The example shown in FIG. 11 consists of four RF sources 1120, which may represent individual APs, antennae, or similar radiation devices. Each RF source is coupled to a control circuit 1132, which will control the RF sources accordingly to create the necessary coverage area. In this example, if RF sources 1120 are antennae, then control circuit 1132 may be an antenna coupler that delivers RF energy at different phase offsets or it may be a series of APs with each AP delivering a different RF signal to each RF source 1120. RF sources 1120 may alternatively be APs, which would then dictate that control circuit 1132 be a group of APs which would each be connected to a single antenna.

Thus, methods and apparatus for use in provisioning a mobile communication device in a wireless local area network (WLAN) having a plurality of wireless access points (APs) have been described herein. In one illustrative method, a provisioning procedure is performed between the mobile communication device and the WLAN via the provisioning wireless AP while the mobile communication device is positioned within a provisioning radio frequency (RF) coverage region of the provisioning wireless AP. However, the provisioning RF coverage region is otherwise confined so that a plurality of other mobile communication devices of the WLAN are restricted from access therefrom during the provisioning procedure. The provisioning RF coverage region may be confined by providing the provisioning wireless AP within a secured room, by providing an electromagnetic shield around the provisioning wireless AP, or both, as examples. The provisioning RF coverage region may have a substantially smaller RF coverage area than RF coverage areas of the plurality of wireless APs of the WLAN, whether through reduced transmission power or through beamforming circuitry of the provisioning wireless AP. Further techniques may be employed to provision a primary ESSID of the WLAN with use of a provisioning ESSID of the provisioning wireless AP.

Provisioning equipment of the present disclosure for a WLAN which includes a plurality of wireless APs for wireless communications with a plurality of mobile communication devices may comprise a provisioning wireless AP for the WLAN and a wireless AP coverage restriction apparatus which is configured to confine a provisioning radio frequency (RF) coverage region of the provisioning wireless AP so as to restrict the plurality of mobile communication devices from access therewithin without confining RF coverage regions of the plurality of wireless APs. The wireless AP coverage restriction apparatus may be or include a secured room structure within which the provisioning wireless AP is provided for confining the provisioning RF coverage region, or an electromagnetic shield which surrounds the provisioning wireless AP. The provisioning RF coverage region may have a substantially smaller RF coverage area than RF coverage areas of the plurality of wireless APs of the WLAN, through reduced transmission power or through beamforming circuitry of the wireless AP. A provisioning server may be included in such provisioning equipment. For example, the provisioning server may be configured to cause an extended set service identifier (ESSID) to be sent to the mobile communication device via the provisioning wireless AP during the provisioning procedure for programming in memory of the mobile communication device, so that the mobile communication device is thereafter programmed to associate with any of the plurality of wireless APs of the WLAN.

A wireless local area network (WLAN) of the present disclosure includes a plurality of wireless access points (AP) which are configured to provide a radio frequency (RF) coverage region for the WLAN for wireless communications with a plurality of mobile communication devices; a provisioning wireless AP; a provisioning server which is configured to perform a provisioning procedure with a mobile communication device through the provisioning wireless AP; and a wireless AP coverage restriction apparatus which is configured to confine a provisioning RF coverage region of the provisioning wireless AP so as to restrict the plurality of mobile communication devices from access therewithin. The coverage restriction apparatus may comprise a secured room structure within which the provisioning wireless AP is provided for confining the provisioning RF coverage region, and/or an electromagnetic shield which surrounds the provisioning wireless AP. The coverage restriction apparatus may configured to cause the provisioning RF coverage region to have a substantially smaller RF coverage area than RF coverage areas of the plurality of wireless APs of the WLAN, through reduced transmission power or through beamforming circuitry of the wireless AP. The provisioning server may be configured to cause an ESSID to be sent to the mobile communication device via the provisioning wireless AP during the provisioning procedure for programming in memory of the mobile communication device, so that the mobile communication device is programmed to associate with any of the plurality of wireless APs of the WLAN.

The above-described embodiments of the present disclosure are intended to be examples only. Those of skill in the art may effect alterations, modifications and variations to the particular embodiments without departing from the scope of the application. For example, although 802.11-based networks have been described in the preferred embodiment, other suitable network technologies may be utilized such as 802.16-based network (i.e. WiMAX) technologies. The invention described herein in the recited claims intends to cover and embrace all suitable changes in technology.

What is claimed is:

1. A method for use in provisioning a mobile communication device in a wireless local area network (WLAN), the WLAN including a plurality of wireless access points (APs) which provide wireless communications with a plurality of mobile communication devices, the method comprising the acts of:

providing one of the plurality of wireless APs as a provisioning wireless AP for the WLAN;

providing the provisioning wireless AP within a secured room, the secured room being made of a secured room structure having a wall structure and an entry door, the secured room structure being configured to restrict the plurality of mobile communication devices from entry therewithin;

causing the provisioning RF coverage region of the provisioning wireless AP to have a substantially smaller RF coverage area than the area of the secured room structure and the RF coverage areas of the plurality of wireless APs;

providing a security access controller for the secured room which is configured to control an opening of the entry door of the secured room in response to a first authentication procedure for an accessing party having the mobile communication device;

after proper authentication of the accessing party using the first authentication procedure, allowing entrance for the accessing party having the mobile communication device within the secured room via the entry door using the security access controller;

while the mobile communication device is confined within the secured room and within the provisioning RF coverage region, allowing the mobile communication device to associate with the provisioning wireless AP with use of a provisioning ESSID, for establishing layer-2 communications between the mobile communication device and the WLAN, for access to and operation in a provisioning VLAN of the WLAN;

while the mobile communication device is associated with the provisioning wireless AP and operating in the provisioning VLAN:

sending, to the mobile communication device via the provisioning wireless AP, an IP address which is assigned to the mobile communication device, for establishing layer-3 communications between the mobile communication device and the WLAN;

sending, to the mobile communication device via the provisioning wireless AP, a network address of a provisioning server of the WLAN;

after the layer-3 communications are established and the network address of the provisioning server is sent, causing a second authentication procedure for the mobile communication device to be performed, via the provisioning wireless AP, with the provisioning server identified by the network address; and after positive authentication of the mobile communication device using the second authentication procedure: causing a provisioning procedure to be performed between the mobile communication device and the provisioning server via the provisioning wireless AP, to program the provisioning information in the mobile communication device.

2. The provisioning method of claim 1, wherein the first authentication procedure comprises the further acts of:

receiving an identification and/or password of the accessing party;

comparing the identification and/or password of the accessing party with a known identification and/or password; and if there is a match between the identification and/or password of the accessing party and the known identification and/or password, causing the entry door to be unlocked and/or opened by the security access controller for allowing entrance for the accessing party within the secured room.

3. The provisioning method of claim 1, wherein the security access controller comprises one of a wireless access control unit and a keypad entry control unit for authentication of an identification and/or password of the accessing party.

4. The provisioning method of claim 1, further comprising:

causing the provisioning RF coverage region to have the substantially smaller RF coverage area with use of beamforming circuitry of the provisioning wireless AP.

5. The provisioning method of claim 1, wherein the secured room structure is constructed with one of a conductive electromagnetic shielding material and an RF absorption material.

6. The provisioning method of claim 1, further comprising:

for the provisioning procedure:

causing an extended set service identifier (ESSID) of the WLAN to be sent from the provisioning wireless AP to the mobile communication device for programming in memory of the mobile communication device, so that the mobile communication device is thereafter programmed to associate with any of the plurality of wireless APs of the WLAN.

7. Provisioning equipment for a wireless local area network (WLAN) which includes a plurality of wireless access points (APs) for use in providing wireless communications for a plurality of mobile communication devices, the provisioning equipment comprising:

a provisioning wireless access point (AP) of the WLAN;

a provisioning server of the WLAN, the provisioning server being configured for use in provisioning a mobile communication device with provisioning information via the provisioning wireless AP;

the provisioning wireless AP being confined within a secured room structure of a secured room having a wall structure and an entry door, the secured room structure being configured to restrict the plurality of mobile communication devices from entry therewithin;

a security access controller for the secured room, the security access controller being configured to control an opening of the entry door of the secured room in response to a first authentication procedure for an accessing party having the mobile communication device, for allowing entry for the accessing party into the secured room;

the provisioning wireless AP being further configured to cause its provisioning RF coverage region to have a substantially smaller RF coverage area than the area of the secured room structure and the RF coverage areas of the plurality of wireless APs;

the provisioning wireless AP being further configured to, while the mobile communication device is confined within the secured room and within the provisioning RF coverage region, allow the mobile communication device to associate with it with use of a provisioning ESSID, for establishing layer-2communications between the mobile communication device and the WLAN for access to and operation in a provisioning VLAN of the WLAN;

the provisioning wireless AP being further configured to, while the mobile communication device is associated with the provisioning wireless AP and operating in the provisioning VLAN, send to the mobile communication device an IP address which is assigned to the mobile communication device, for establishing layer-3 communications between the mobile communication device and the WLAN;

the provisioning wireless AP being further configured to, while the mobile communication device is associated with the provisioning wireless AP and operating in the provisioning VLAN, send to the mobile communication device a network address of the provisioning server;

the provisioning AP server being further configured to, after the layer-3 communications are established and the network address of the provisioning server is sent, cause a second authentication procedure with the mobile communication device to be performed via the provisioning wireless AP; and the provisioning server being further configured to, after positive authentication of the mobile communication device using the second authentication procedure, provision the mobile communication device with the provisioning information via the provisioning wireless AP.

8. The provisioning equipment of claim 7, wherein the security access controller comprises one of a wireless access control unit and a keypad entry control unit for authentication of an identification and/or password of the accessing party.

9. The provisioning equipment of claim 7, wherein the secured room structure is. constructed with one of a conductive electromagnetic shielding material and an RF absorption material.

10. The provisioning equipment of claim 7, wherein the provisioning wireless AP is further configured to cause the provisioning RF coverage region to have the substantially smaller RF coverage area with use of beamforming circuitry of the provisioning wireless AP.

11. A wireless local area network (WLAN) comprising:
a plurality of wireless access points (AP) which are configured to provide a radio frequency (RF) coverage region for the WLAN for wireless communications with a plurality of mobile communication devices;
a provisioning wireless AP of the WLAN;
a provisioning server which is also part of the provisioning VLAN of the WLAN;
an IP address assigning server which is part of a provisioning VLAN of the WLAN;
the provisioning server being configured to perform a provisioning procedure with a mobile communication device through the provisioning wireless AP to program provisioning information in the mobile communication device;
a secured room within which the provisioning wireless AP is located;
a secured room structure of the secured room having a wall structure and an entry door, the secured room structure being configured to restrict the plurality of mobile communication devices from entry therewithin;
a security access controller for the secured room, the security access controller being configured to control an opening of the entry door of the secured room in response to a first authentication procedure for an accessing party having the mobile communication device, for allowing entry for the accessing party into the secured room;
the provisioning wireless AP being configured to cause its provisioning RF coverage region to have a substantially smaller RF coverage area than the area of the secured room structure and the RF coverage areas of the plurality of wireless APs;

the provisioning wireless AP being further configured to, while the mobile communication device is confined within the secured room and within the provisioning RF coverage region, allow the mobile communication device to associate with it with use of a provisioning ESSID, for establishing layer-2communications between the mobile communication device and the WLAN for access to and operation in the provisioning VLAN;

the IP address assigning server being further configured to, while the mobile communication device is associated with the provisioning wireless AP and operating in the provisioning VLAN, assign an IP address to the mobile communication device for establishing layer-3 communications between the mobile communication device and the WLAN;

the provisioning wireless AP being further configured to, while the mobile communication device is associated with the provisioning wireless AP and operating in the provisioning VLAN, send to the mobile communication device a network address of a provisioning server of the WLAN;

the provisioning server being further configured to, after the laver-3 communications are established and the network address of the provisioning server is sent, cause a second authentication procedure with the mobile communication device to be performed via the provisioning wireless AP; and the provisioning server being further configured to, after positive authentication of the mobile communication device using the second authentication procedure, perform the provisioning procedure with the mobile communication device via the provisioning wireless AP, to program the provisioning information in the mobile communication device.

12. The WLAN of claim 11, wherein the security access controller comprises one of a wireless access control unit and a keypad entry control unit for authentication of an identification and/or password of the accessing party.

13. The WLAN of claim 11, wherein the secured room structure is constructed with one of a conductive electromagnetic shielding material and an RF absorption material.

14. The WLAN of claim 11, wherein the provisioning wireless AP is further configured to cause the provisioning RF coverage region to have the substantially smaller RF coverage area with use of beamforming circuitry of the provisioning wireless AP.

* * * * *